US006708103B2

(12) United States Patent
Wild et al.

(10) Patent No.: US 6,708,103 B2
(45) Date of Patent: Mar. 16, 2004

(54) METHOD, COMPUTER PROGRAM, AND CONTROL AND/OR REGULATING DEVICE FOR OPERATING AN INTERNAL COMBUSTION ENGINE

(75) Inventors: Ernst Wild, Oberriexingen (DE); Detlef Heinrich, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 09/970,498

(22) Filed: Oct. 4, 2001

(65) Prior Publication Data

US 2002/0052683 A1 May 2, 2002

(30) Foreign Application Priority Data

Oct. 4, 2000 (DE) .......................................... 100 48 926

(51) Int. Cl.⁷ ................................................. B60T 7/12
(52) U.S. Cl. ....................... 701/107; 701/104; 701/105; 123/406.12; 123/339.11; 123/425
(58) Field of Search ................................ 701/107, 103, 701/104, 105; 123/406.11, 406.12, 339.11, 339.12, 425; 60/601

(56) References Cited

U.S. PATENT DOCUMENTS

| | | | | |
|---|---|---|---|---|
| 4,593,663 A | * | 6/1986 | Atago et al. | 123/339.12 |
| 5,495,835 A | * | 3/1996 | Ueda | 123/339.11 |
| 6,386,180 B1 | * | 5/2002 | Gerhardt et al. | 123/350 |
| 6,505,605 B2 | * | 1/2003 | Yamada et al. | 123/406.14 |
| 6,539,915 B1 | * | 4/2003 | Wild et al. | 123/295 |

* cited by examiner

Primary Examiner—Willis R. Wolfe
Assistant Examiner—Johnny H. Hoang
(74) Attorney, Agent, or Firm—Michael J. Striker

(57) ABSTRACT

Controlling an internal combustion engine which has an additional component provided in its exhaust gas conduit including a turbine and turbo of a turbo charger, includes enriching a mixture at a high throughput, determining a main filling signal by a main filling signal sensor and a substitute filling signal by a substitute filling sensor, converting the substitute filling signal into a control signal for at least one value selected from the group consisting of an air supply, a fuel supply and an ignition time point, such that the substitute filling signal is greater than the main filling signal by at least one protective factor, and selecting the protective factor so that at high throughput a change of the mixture toward a fattening is performed.

10 Claims, 2 Drawing Sheets

METHOD, COMPUTER PROGRAM, AND CONTROL AND/OR REGULATING DEVICE FOR OPERATING AN INTERNAL COMBUSTION ENGINE

BACKGROUND OF THE INVENTION

The present invention relates to a method for operating an internal combustion engine.

More particularly, it relates to a method of operating of an internal combustion engine which has an exhaust gas conduit provided with an additional component, in particular a turbine and a turbocharger, in which at high throughput the mixture is changed to be richer, and based on at least one main filling signal sensor a main filling signal, and based on of at least one substitute filling signal sensor at least one substitute filling signal is determined.

A method of this type is known. It is based on the experience that for example a turbocharger in an exhaust gas conduit can be damaged at very high exhaust gas temperatures. High exhaust gas temperatures also occur mainly at a very high air throughput or in other words at a high rotary speed. In order to lower the exhaust gas temperature in this operational condition the mixture at very high throughput is enriched. The excess of fuel is evaporated and provides a cooling of the exhaust gas which exits the combustion chambers.

In known methods the required air filling in the combustion chambers for obtaining an optimal mixture is determined on the basis of a main filling signal sensor. In order to perform the operation also in the case of a failure of the main filling signal sensor it is proposed in the inventive method to determine a substitute filling signal which is obtained from a substitute filling signal sensor. If the main filling signal and the substitute filling signal exceed more than a predetermined error factor, the calculation of the filling of the combustion chamber is performed on the basis of the signal of the substitute filling signal sensor.

When the known method was performed, it was however determined that damages to the turbocharger arranged in the exhaust gas conduit by excessively high temperatures of the exhaust gas can not be completely excluded.

SUMMARY OF THE INVENTION

Accordingly, it is an object of the present invention to provide a method of the above mentioned type, which avoids the disadvantages of the prior art.

More particularly, it is an object of present invention to provide a method of the above mentioned type, which is performed so that the service life of the turbocharger or another additional component arranged in the exhaust gas conduit of the internal combustion chamber is as long as possible.

In keeping with these objects and with others which will become apparent hereinafter, one feature of present invention resides, briefly stated, in a method in which the substitute filling signal is converted into a control signal for at least one value selected from the group consisting of an air supply, a fuel supply, and an ignition time point, when it is greater than the main filling signal by at least a protective factor, and a protective factor is selected so that at high throughput the change of the mixture consist of enriching.

The inventive solutions is based on the following considerations. When the main filling signal sensor supplies a signal which is too small, a filling of the combustion chambers of the internal combustion engine is performed, which is smaller than the actual filling. Correspondingly also the quantity of the injected fuel is reduced. When such an internal combustion engine operates with the high throughput and for protection of turbo charger the mixture is fattened, based on this actually poor mixture is achieved. With a main filling signal sensor which provides a main filling signal which is smaller than that corresponding to the actual filling, or in other words at high throughput, the mixture is not always fattened, or in other words operated with fuel surplus, but instead from a too poor condition is brought into a substantially richer condition.

The inventive method is as follows. In order to determine more reliably that at high throughput the mixture actually is fattened (the internal combustion engine is operated in a too fattened condition with fuel surplus), it is not necessary to do anything else but to determine a maximum value from a substitute filling signal and a main filling signal and to use the substitute filling signal for computation of the filling of the combustion chamber of the internal combustion engine when the substitute filling signal is greater than the main filling signal by a protective factor. The expression "protective factor" is selected so that it deals with a factor which provides protection of the additional component arranged in the exhaust gas conduit. The value of the protective factor is determined simply from the requirement, that at constant enrichment in high load region in each case a substantial fattening must be guaranteed. In practice the protective factor is so small that already with a low deviation it is switched to the substitute filling signal.

The inventive process therefore guarantees that with a high throughput also actually a fattening of the mixture is performed and thereby the temperature in the exhaust gas of the internal combustion engine is reduced and the additional components arranged in the exhaust gas conduit are protected from a temperature-dependent damage.

In accordance with another feature of the present invention, it can be for example provided that when the main filling signal differs by at least an error factor from the substitute filling signal, the main filling signal is recognized as defective and the substitute filling signal instead of the main filling signal is converted into a control signal for at least one value selected from the group consisting of the air supply, fuel supply or ignition time point, wherein the protective factor is substantially smaller than the error factor.

The use of the substitute filling signal is performed also when the main filling signal is not defective in its own sense. As a defective main filling signal namely conventionally a relatively great deviation from the substitute filling signal is considered, since this deviation is calculated from the sum of the additional tolerances of the main filling signal sensor and the substitute filling sensor. In accordance with the present invention it is determined that a mixture which is too poor and makes impossible the fattening required at high throughput is provided at deviations between the substitute filling signal and the main filling signal which is substantially smaller than the sum of the above mentioned tolerances.

In an especially preferable quantitative example, the error factor is located in the region of +/−25% and the protective factor is located in the region +25%.

The main filling signal sensor can be formed for example as a heating wire air measuring sensor. Such sensor has a heated element which is located in the air stream to be measured and is cooled by the latter. Conventionally, the heated element is a part of an electrical bridge circuit, and is held by a flowing stream at constant upper temperature with respect to the temperature of the aspirated air. The required heating stream is a value which is simply processed for the inventive method, for the air mass aspirated by the internal combustion engine.

In accordance with a further embodiment of the invention, it is further proposed that the substitute filling signal is obtained from a position sensor of a throttle flap and in some cases from a rotary speed sensor and in some cases from a pressure sensor in the aspiration pipe. The corresponding sensors are available in numerous internal combustion engines and allow determination of the filling of the internal combustion engine in a relatively simple and precise manner.

The present invention also deals with a computer program, which is suitable for performing the above mentioned method when a computer is utilized. It is especially advantageous when the computer program is stored in a storage, for example a flash memory.

Finally, the invention also deals with a control and/or regulation device for operation of an internal combustion engine, in which additional components, in particular a turbine and a turbo charger are arranged in its exhaust gas conduit, with means which in the event of a high throughput produce a control signal for changing the mixture in direction toward reacher mixture with means for determination of a main filling signal and with means for determination of a substitute filling signal.

For protecting the additional components arranged in the exhaust gas conduit in the case of high throughput from excessively high temperatures, it is proposed in the inventive device to convert the substitute filling signal into a control signal for at least one value selected from the group consisting of air supply, fuel supply and an ignition time point, when it is greater than the main filling signal by a protective factor, and the protective factor is selected so that the change of the mixture resides in its fattening.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
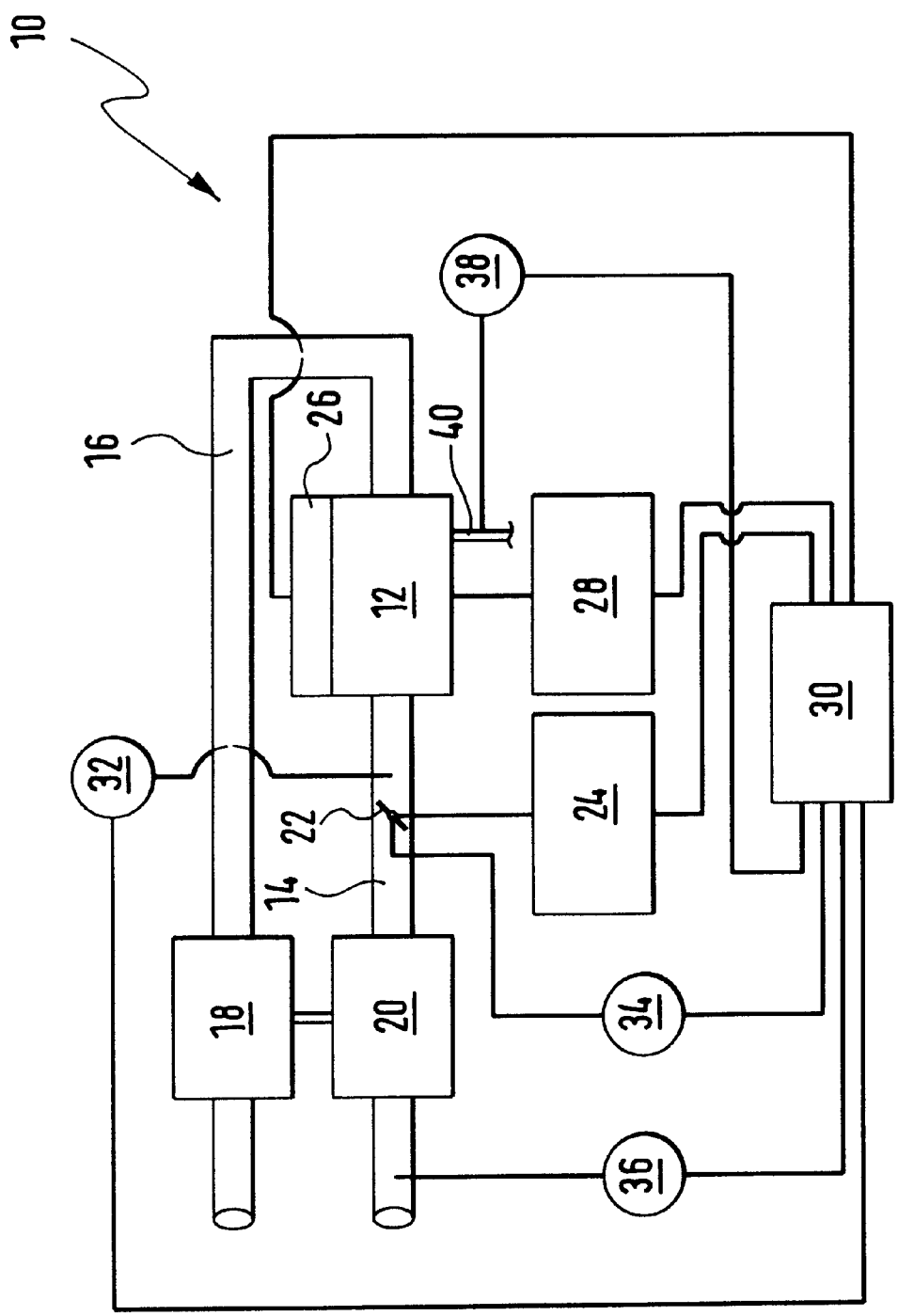
FIG. 1 is a view showing a block diagram of an internal combustion engine operated in accordance with the present invention.

An internal combustion engine shown in FIG. 1 is identified as a whole with reference numeral 1. It includes a motor block 12 which includes first of all the motor housing itself and the internal combustion engine. The air which is required for the operation is supplied to the motor block through a suction conduit 14. The exhaust gas is withdrawn from the motor block through an exhaust gas conduit 16.

A turbine 18 is located in the exhaust gas conduit 16 mechanically connected with a compressor 20 which is arranged also in the suction conduit 14. A throttle flap 22 is provided between the compressor 20 and the motor block 12 so that the air supplied to a motor block 12 can be adjusted. The throttle flap 22 is moved by an adjusting motor 24.

Injection valves 26 are connected directly with the motor block 12 and provided for supply of the fuel to the combustion chambers of the motor block 12. Not shown ignition candles in the motor block 12 are further fed from an ignition element 28.

The internal combustion engine 10 further has a control and regulating device 30 which at the output side is provided with an adjusting motor 24, the ignition element 28 and the valves 26. At the input side the control and regulating unit 30 receives signals from the several sensors. The sensors can include a pressure sensor 32 which is arranged in the suction conduit 14 between the throttle flap 22 and the motor block 12 and supplies the signals corresponding to the loading pressure to the control and regulating unit 30. Alternatively the pressure sensor 32 can be arranged between the compressor 20 and the throttle flap 22. The control and regulating unit 30 also obtain signals from a position transmitter 34 of the throttle flap 22. Moreover, upstream of the compressor 20 in the suction conduit 14, a heating wire air mass measuring sensor 36 is provided. It supplies to the control and regulating device 30, through a not shown bridge circuit, a filling signal which corresponds to the filling of the combustion chambers in the motor block 12. The control and regulating device 30 is finally connected with a rotary speed transmitter 38 which detects the rotary speed of a crankshaft 40 and supplies corresponding signals.

Figure 2:
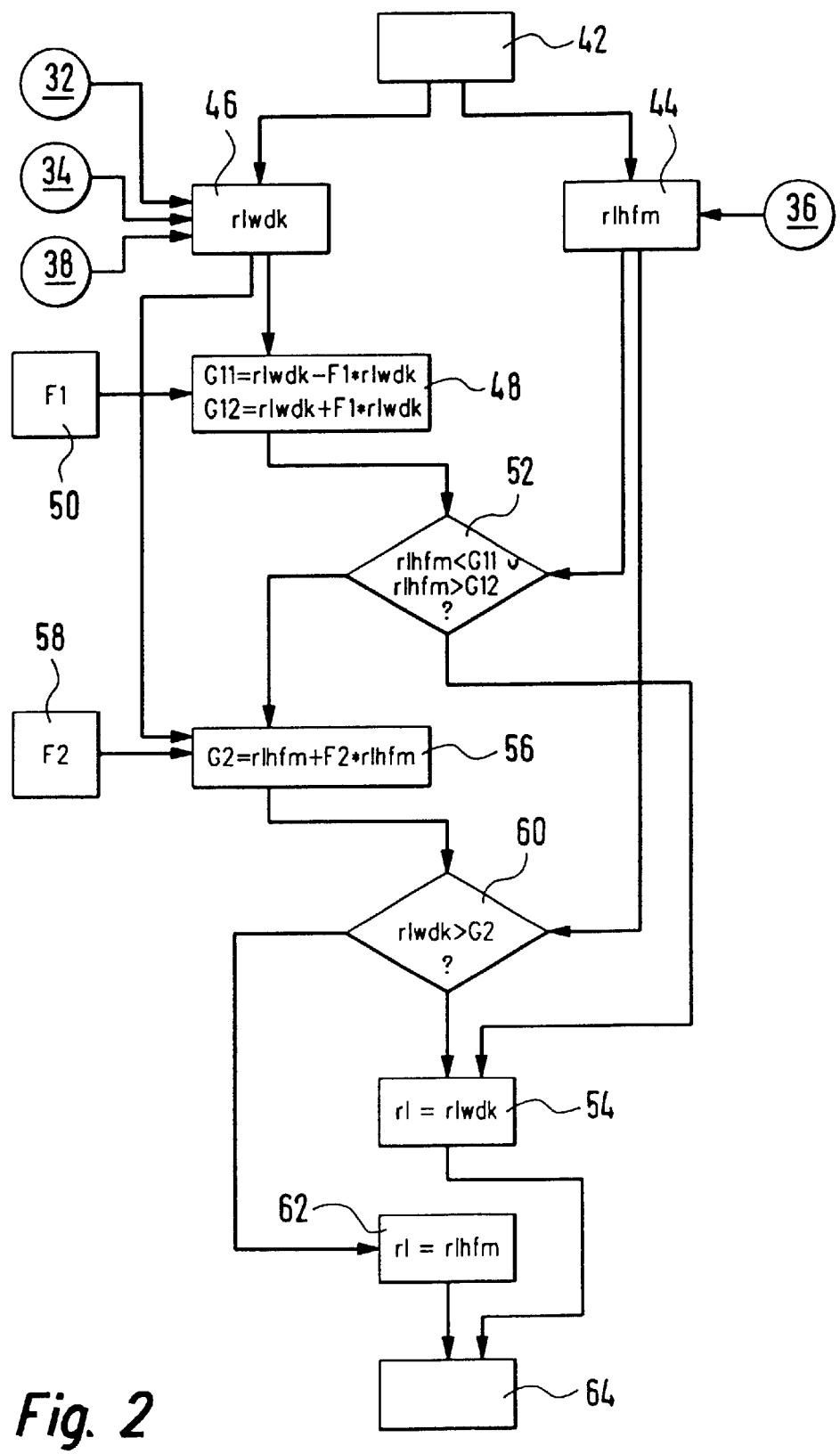
FIG. 2 is a flow diagram of a method of operation of the internal combustion engine of FIG. 1.

The internal combustion engine 10 is controlled by a method which is stored in form of a computer program in a not shown flash memory of the control and regulating device 30. The method operates in the following manner as illustrated in FIG. 2:

The method starts in a star block 42. At the right side of FIG. 2 first in block 44 a main filling signal block 44 is determined from the signal of the heating wire air mass measuring sensor 36 and the rotary speed transmitter 38. The air mass stream measured by the air mass measuring sensor 36 is divided by the rotary speed and a constant produces the main filling signal. The heating wire air mass measuring sensor 36 is a main filling signal sensor. The main filling signal is identified as rlhfm. Parallel to this, in a block 46 a substitute filling signal rlwdk is formed from the signals of the loading pressure sensor 32, the adjusting transmitter 34 of the throttle flap 22, and the rotary speed transmitter 38 for the crankshaft 40.

A lower limiting value G11 is formed in a block 48 from the throttle flap-based substitute signal rlwdk and an error factor stored in a permanent value storage 50, in particular in accordance with the formula: G11=rlwdk−F1×rlwdk. Furthermore, an upper limiting value G12 is formed in the block 48 in accordance with the formula G12=rlwdk+F1×rlwdk. A comparison is performed in a comparison block 52, whether the main filling signal rlhfm determined in the block 44 is smaller than the lower limiting value G11 determined at the block 48 or greater than the limiting value G12 determined in the same block.

The error factor F1 which is stored in the fixed memory storage 50 is selected so that an over shooting or an undershooting of the both limiting values G11 or G12 in each case is considered as a defective main filling signal rlhfm. Conventionally, the error factor F1 amounts to approximately +/−25%. This value is produced from the sum of the permissible tolerances of the heating wire air mass sensor 36 (+/−7%), the system composed of a throttle flap 22 an the position transmitter 34 (+/−15%) and the pressure sensor 32 (approximately +/−3%).

If the response in block 52 is yes, then in a block 54 the filling signal rl used for the measurement of the fuel quantity is set equal to the substitute filling signal rlwdk. With this feature in the case of a defective main filling signal rlhfm, it is switched to the substitute filling signal rlwdk.

If the answer in block 52 is no, then in a block 56, based on a protective factor F2 which is stored in a fixed value memory 58, a limiting value G2 is formed in accordance with the formula G2=rlhfm +F2×rlhfm. In a comparison block 60 it is determined whether the substitute filling signal rlwdk which was formed in the block 46 is greater than the limiting value G2. The value of the protective factor F2 is measured in accordance with the following criteria:

With the internal combustion engine 10 shown in FIG. 1, during the operation with very high rotary speeds or in other words with high throughput, relatively high temperatures can act in the exhaust gas conduit 16 of the gasses which are withdrawn from the motor block 12. These high temperatures can lead to an overheating of the turbine 18 and thereby to its damage. In order to avoid this, in the internal combustion engine 10 by the control and regulating device 30, a corresponding signal is outputted to the injections valves 26, and the mixture is fattened. This means that the mixture ratio between air and fuel is changed from a normal condition to a substantially fatter condition, or in other words too much fuel is injected.

Since the degree of enrichment by the control and regulating device 30 is constant, therefore when the main filling signal rlhfm has a smaller value than supplied in the reality, also the corresponding injection signal is smaller, so that the desired fattening does not occur and the mixture goes from too poor to a substantially less poor. The protective factor F2 is selected so that the limiting value G2 is somewhat greater than a filling signal, from which the desired fattening at high throughput can no longer occur. The protective factor F2 can be very much smaller than the error factor F1. It lies typically in the region of approximately 5%, which corresponds to the internal combustion engine 10 precontrolled with a mixture factor lambda=0.9 an erroneously operated with lambda=1.

If the substitute filling signal rlwdk is actually greater than the limiting value G2, this is determined in a comparison block 60 and the filling signal rl is set equal to the throttle flap-based substitute filling signal rlwdk. If the answer in the block 60 is no, then for the filling computation the filling signal rl is set equal to the main filling signal rlhfm determined by means of the heating wire air mass sensor 36 (block 62).

The computer program shown in FIG. 2 ends in block 64.

It will be understood that each of the elements described above, or two or more together, may also find a useful application in other types of constructions differing from the types described above.

While the invention has been illustrated and described as embodied in method, computer program, and control and/or regulating device for operating an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of controlling an internal combustion engine which has an additional component provided in its exhaust gas conduit, the method comprising the steps of enriching a mixture at a high throughput, determining a main filling signal by a main filling signal sensor and a substitute filling signal by a substitute filling sensor, converting the substitute filling signal into a control signal for at least one value selected from the group consisting of an air supply, a fuel supply and an ignition time point, when said substitute filling signal is greater than the main filling signal by at least one protective factor; and selecting the protective factor so that at high throughput a change of the mixture toward a fattening is performed.

2. A method as defined in claim 1; and further comprising recognizing the main signal as defective when the main signal is different from the substitute filling signal by at least one error factor; and converting the substitute filling signal instead of the main filling signal into a control signal for at least one value selected from the group consisting of an air supply, a fuel supply and an ignition time point; and selecting the protective factor substantially smaller than the error factor.

3. A method as defined in claim 1; and further comprising selected the error factor in a region of +/−25%.

4. A method as defined in claim 1; and further comprising selecting the protective factor in the region of +5%.

5. A method as defined in claim 1; and further comprising obtaining the main filling signal from a heating wire air mass measuring sensor.

6. A method as defined in claim 1; and further comprising obtaining the substitute filling signal from an element selected from the group consisting of a position signal of a throttle flap, and rotary speed sensor, and a pressure sensor in a suction pipe.

7. A computer program which is formed for performing a method of controlling an integral combustion engine which has an additional component provided in its exhaust gas conduit, the method comprising the steps of enriching a mixture at a high throughput, determining a main filling signal by a main filling signal sensor and a substitute filling signal by a substitute filling sensor, converting the substitute filling signal into a control signal for at least one value selected from the group consisting of an air supply, a fuel supply and an ignition time point, when said substitute filling signal is greater than the main filling signal by at least one protective factor; and selecting the protective factor so that at high throughput a change of the mixture toward a fattening is performed.

8. A computer program as defined in claim 7, wherein the computer program is stored in a storage formed as flash memory.

9. A device selected from the group consisting of a control device and a regulating device for operating an internal combustion engine which has an additional component provided in its exhaust gas conduit, the device comprising means for enriching a mixture at a high throughput, means for determining a main filling signal by a main filling signal sensor and a substitute filling signal by a substitute filling sensor, means for converting the substitute filling signal into a control signal for at least one value selected from the group consisting of an air supply, a fuel supply and an ignition time point, when said substitute filling signal is greater than the main filling signal by at least one protective factor; and means for selecting the protective factor so that at high throughput a change of the mixture toward a fattening is performed.

10. A device as defined in claim 8; and further comprising means for recognizing, the main filling signal as defective and converting the substitute filling signal instead of the main filling signal into a control signal for at least one value selected from the group consisting of air supply, fuel supply and ignition time point with the protective factor being substantially smaller than the error factor when the main filling signal exceeds the substitute filling signal by at least one error factor.

* * * * *